Patented May 1, 1923.

1,453,659

UNITED STATES PATENT OFFICE.

GUILLAUME DE MONTMOLLIN, JOSEF SPIELER, AND GÉRALD BONHÔTE, OF BASEL, SWITZERLAND, ASSIGNORS TO SOCIETY OF CHEMICAL INDUSTRY IN BASLE, OF BASEL, SWITZERLAND.

INTERMEDIATE PRODUCT FOR THE MANUFACTURE OF DYESTUFFS AND PROCESS OF MAKING SAME.

No Drawing. Application filed April 4, 1922. Serial No. 549,550.

*To all whom it may concern:*

Be it known that we, GUILLAUME DE MONTMOLLIN, JOSEF SPIELER, and GÉRALD BONHÔTE, all three citizens of the Swiss Republic, and residents of Basel, Switzerland, have invented a new Intermediate Product for the Manufacture of Dyestuffs and Processes of Making Same, of which the following is a full, clear, and exact specification.

The U. S. Letters Patent No. 1,387,596 describes a process for the manufacture of a dyestuff derived from the trioxytrinaphthylmethane which consists in reacting with a tetrahalogenized derivative of the methane on the 1-oxynaphthalene-2-carboxylic acid in presence of agents capable of neutralizing the acids.

We have found that in the course of this reaction, there is still produced, besides the coloring matter, new compounds derived from the 1-oxynaphthalene-2-carboxylic acid, which are on the one hand the 4:4'-dioxydinaphthyl-1:1'-ketone-3:3'-dicarboxylic acid corresponding to the formula:

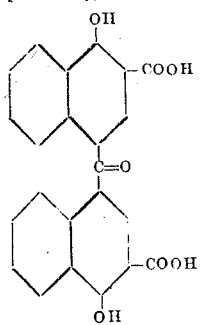

and on the other hand the 1-oxynaphthalene-2:4-dicarboxylic acid corresponding to the formula:

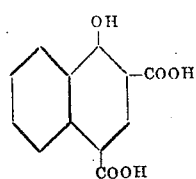

The 4:4' - dioxydinaphthyl - 1:1' - ketone-3:3'-dicarboxylic acid and the 1-oxynaphthalene-2:4-dicarboxylic acid can easily be separated from the mixture obtained by the action of the tetrahalogenized derivatives of the methane on the 1-oxynaphthalene-2-carboxylic acid according to the process of the aforesaid patent, by virtue of the different solubilities of the alkaline and earth alkaline salts of the products of this reaction. It is also posible, by varying in a convenient manner the stochiometric data and the dilutions of the examples of the aforesaid patent, to increase the quantity of these acids and diminish that of the coloring matter.

These compounds are particularly valuable as intermediate products in the manufacture of the dyestuffs.

*Example.*

(*a*) The solutions of the coloring matter isolated according to the statement of example 3 of the aforesaid patent are acidified with hydrochloric acid. The precipitate formed is separated by filtration and again dissolved in caustic soda. To the solution thus obtained common salt is added; there is thereby precipitated the disodium salt of the 4:4'-dioxydinaphthyl-1:1'-ketone-3:3'-dicarboxylic acid, which is then purified by crystallization in water.

The 4:4' - dioxydinaphthyl - 1:1' - ketone-3:3'-dicarboxylic acid constitutes a whitish powder, difficulty soluble in water and the organic solvents. On the contrary is dissolves easily in the aqueous solutions of the alkaline carbonates and the caustic alkalies, giving in the latter case a yellow liquor; when quickly heated, it decomposes itself at a temperature near 259° C.

(*b*) The solutions from which we have precipitated by means of common salt the disodium salt of the 4:4'-dioxydinaphthyl-1:1'-ketone-3:3'-dicarboxylic acid are acidified. The precipitate formed is separated by filtration, then extracted by a boiling solution of baryte water; the liquor obtained gives after filtration and acidification the 1-oxynaphthalene-2:4-dicarboxylic acid in the form of white flocks.

This acid has in dry state the aspect of a whitish powder difficulty soluble in water and the organic solvents. When heated, it decomposes itself at a temperature near 286° C. Its alkali metal salts are very soluble in water and in contradistinction to the salts of the 1-oxynaphthalene-2-carboxylic acid, very difficulty precipitable by means of common salt.

If the reaction has been effected in aqueous medium, as is the case in the example 2 of the aforesaid patent, we can reverse the order of operations, by reason of the feeble solubility of the disodium salt of the 4:4'-dioxydinaphthyl-1:1'-ketone-3:3'-dicarboxylic acid, that is to say separate successively from the reaction mixture the 4:4'-dioxydinaphthyl-1:1'-ketone-3:3'-dicarboxylic acid, then the coloring matter and finally the 1-oxynaphthalene-2:4-dicarboxylic acid.

If it is desired to reduce the formation of the coloring matter, we may increase the quantity of carbon tetrachloride, then add caustic potash as agent capable of neutralizing the acids and operate in a greatly diluted medium.

What we claim is:—

1. The herein described process for the manufacture of the 4:4'-dioxydinaphthyl-1:1'-ketone-3:3'-dicarboxylic and 1-oxynaphthalene-2:4-dicarboxylic acids, consisting in separating these compounds from the mixture which is produced by acting on 1-naphthalene-2-carboxylic acid with tetrahalogenated methane derivatives in presence of agents capable of neutralizing the acids, by virtue of the characteristic solubilities of the alkali metal and alkaline earth metal salts of the said compounds.

2. As a new product, the 4:4'-dioxydinaphthyl-1:1'-ketone-3:3'-dicarboxylic acid constituting a whitish powder fusing, when quickly heated to near 259° C., dissolving in caustic alkalies with a yellow coloration and corresponding to the formula:

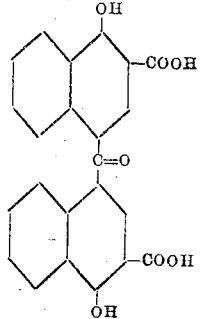

In witness whereof we have hereunto signed our names this 18th day of March, 1922, in the presence of two subscribing witnesses.

GUILLAUME DE MONTMOLLIN.
JOSEF SPIELER.
GERALD BONHÔTE.

Witnesses:
 FRID KURZ,
 AMAND GRAME.